(12) United States Patent
Kemppinen et al.

(10) Patent No.: US 11,320,908 B2
(45) Date of Patent: May 3, 2022

(54) OPERATING UNIT FOR A VEHICLE

(71) Applicant: BEHR-HELLA THERMOCONTROL GMBH, Stuttgart (DE)

(72) Inventors: Pasi Kemppinen, Tampere (FI); Vesa Teikari, Tampere (FI)

(73) Assignee: BEHR-HELLA THERMOCONTROL GMBH, Lippstadt (DE)

( * ) Notice: Subject to any disclaimer, the term of this patent is extended or adjusted under 35 U.S.C. 154(b) by 0 days.

(21) Appl. No.: 16/966,556

(22) PCT Filed: Jan. 21, 2019

(86) PCT No.: PCT/EP2019/051369
§ 371 (c)(1),
(2) Date: Jul. 31, 2020

(87) PCT Pub. No.: WO2019/149557
PCT Pub. Date: Aug. 8, 2019

(65) Prior Publication Data
US 2020/0363873 A1   Nov. 19, 2020

(30) Foreign Application Priority Data

Feb. 2, 2018   (DE) ...................... 10 2018 102 401.0

(51) Int. Cl.
*G06F 3/041* (2006.01)
*G06F 3/045* (2006.01)
(Continued)

(52) U.S. Cl.
CPC .............. *G06F 3/016* (2013.01); *B60K 35/00* (2013.01); *B60K 37/06* (2013.01); *B60K 2370/1438* (2019.05); *B60K 2370/158* (2019.05)

(58) Field of Classification Search
CPC .... G06F 3/011; G06F 3/017; B60G 2400/252
See application file for complete search history.

(56) References Cited

U.S. PATENT DOCUMENTS

| | | | |
|---|---|---|---|
| 2009/0128501 A1* | 5/2009 | Lazaridis | G06F 3/0416 345/173 |
| 2018/0150137 A1* | 5/2018 | Gleissner | H01L 41/09 |
| 2018/0275810 A1* | 9/2018 | Khoshkava | G06F 3/0488 |

FOREIGN PATENT DOCUMENTS

| | | |
|---|---|---|
| DE | 10 2008 046 102 A1 | 3/2010 |
| WO | 2011/138502 A1 | 11/2011 |

(Continued)

OTHER PUBLICATIONS

International Search Report issued in corresponding International Application No. PCT/EP2019/051369 dated Mar. 20, 2019, with English translation.

*Primary Examiner* — Nan-Ying Yang
(74) *Attorney, Agent, or Firm* — Morgan, Lewis & Bockius LLP

(57) ABSTRACT

The invention relates to an operating unit for a vehicle, comprising a touchscreen, an actuator for mechanically exciting the touchscreen upon detection of a valid manual actuation of the touchscreen when an operating command is input, and a counterweight. The actuator is designed as a drive unit with a stator and a translator which move in opposite directions either away from each other or towards each other, namely into an end position, starting from a rest position when the drive unit is actuated and which move back into the rest position from the end position after the actuation has ended, in particular in an automatic manner. The stator is coupled to the touchscreen, and the translator is coupled to the counterweight or vice versa.

10 Claims, 3 Drawing Sheets

Figure 1:
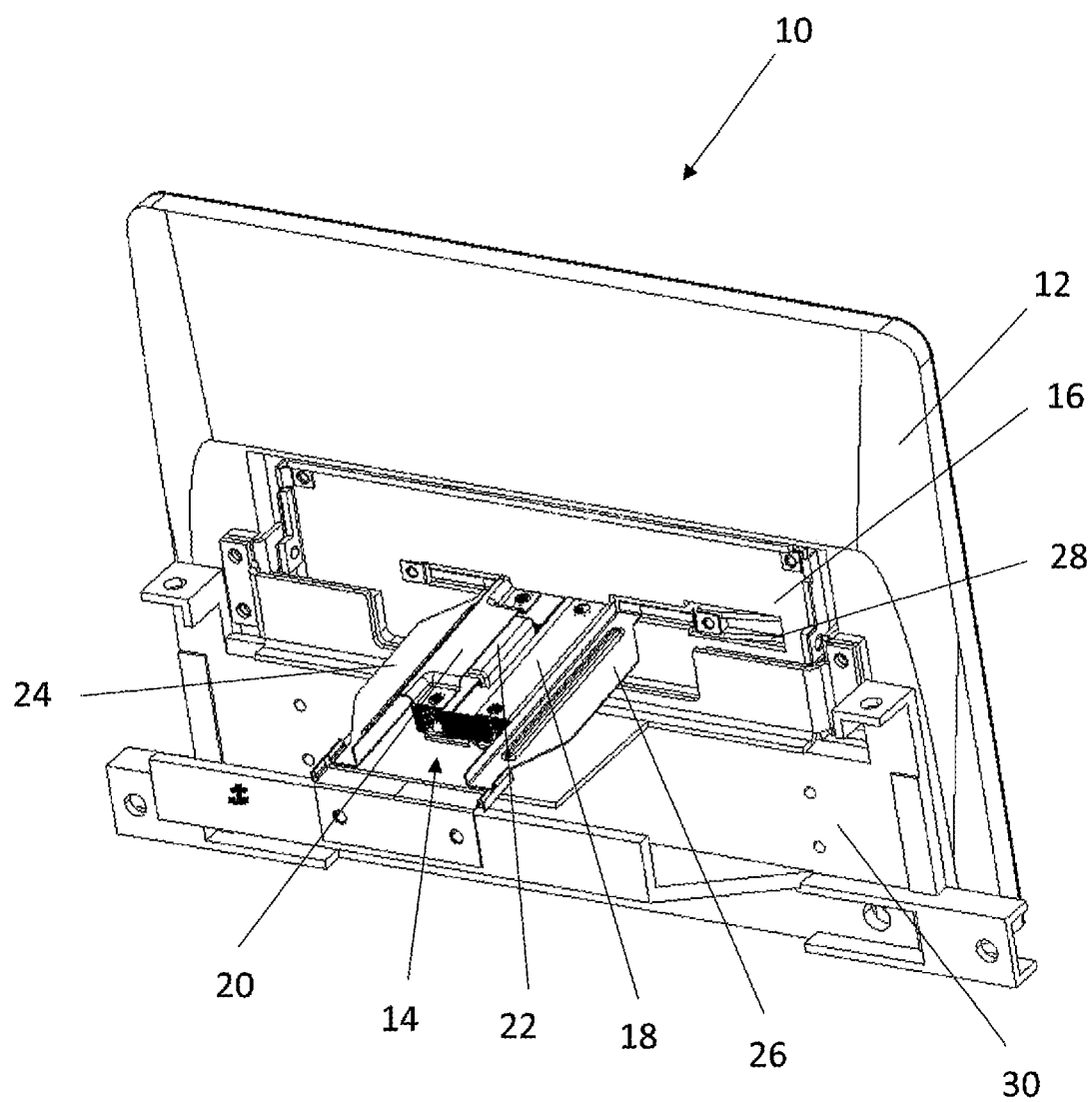

(51) Int. Cl.
*G06F 3/01* (2006.01)
*B60K 35/00* (2006.01)
*B60K 37/06* (2006.01)

(56) References Cited

FOREIGN PATENT DOCUMENTS

| WO | 2017/162586 A1 | 9/2017 |
| WO | 2018/141745 A1 | 8/2018 |

* cited by examiner

OPERATING UNIT FOR A VEHICLE

CROSS REFERENCE

This application is the U.S. National Phase under 35 U.S.C. § 371 of International Application No. PCT/EP2019/051369 filed on Jan. 21, 2019, which claims the benefit of German Application No. 10 2018 102 401.0 filed on Feb. 2, 2018, the entire contents of each are hereby incorporated by reference.

The invention relates to an operating unit for a vehicle with haptic feedback.

Such operating units become increasingly popular and are preferably installed in vehicles. In the case of large displays or touchscreens, the haptic feedback encounters the problem that the touchscreen cannot be moved in a manner completely unaffected by the vehicle environment of the operating unit.

It has therefore been proposed to move a balancing weight or counterweight in a manner inversely phased to the mechanical excitation of the touchscreen. If, for example, the touchscreen is laterally moved to the left in haptic feedback, a counterweight is simultaneously moved to the right, wherein their moving paths are selected according to the relationship of the masses of touchscreen and counterweight (see e.g. DE-A-10 2008 046 102 and WO-A-2017/162586).

It is an object of the invention to provide a simple mechanical and space-saving structure.

According to the invention, for achieving this object, an operating unit for a vehicle has been proposed, wherein the operating unit is provided with a touchscreen,
an actuator for mechanically exciting the touchscreen upon detection of a valid manual actuation of the touchscreen when an operating command is input, and
a counterweight,
wherein the actuator as a drive unit is configured with a stator and a translator which, upon actuation of the drive unit, move in opposite directions either away from each other or towards each other starting from a rest position, namely into an end position, and which in particular automatically move back from the end position into the rest position when the actuation has been ended, and
wherein the stator is coupled to the touchscreen and the translator is coupled to the counterweight, or vice versa.

Accordingly, the invention thus proposes to mechanically arrange the actuator between the touchscreen and the counterweight with respect to the force flow. The actuator comprises a stator and a translator, wherein either the stator is connected to the touchscreen and the translator is connected to the counterweight or vice versa. Thus, the actuator comprises two elements, namely the stator and the translator, moving during actuation of the drive unit. The two elements drive another element, namely, the touchscreen and the counterweight, respectively. This is performed in an inversely phased manner such that in the case of a corresponding design of the masses and moving paths the outwardly acting forces are compensated for.

According to an embodiment of the invention, the counterweight and the actuator (that is stator and translator) are different entities, i.e. different elements.

According to a preferred aspect of the invention, it may be provided that the drive unit is configured as an electromagnet, in particular an armature-type electromagnet, wherein either the stator or the translator comprises an excitation coil, and that that portion of the electromagnet which is provided with the excitation coil is coupled to the counterweight. The mechanical coupling of that portion of the electromagnet which comprises the excitation coil offers the advantage that this portion of the electromagnet can also act as a counterweight.

Further, it can be advantageous when the drive unit is configured as a plunger-coil-type drive having an excitation coil, wherein that portion of the plunger-coil-type drive which comprises the excitation coil is coupled to the counterweight.

According to another appropriate embodiment of the invention, it may be provided that the translator and the stator each have connected thereto a coupling element assembly, wherein the one coupling element assembly is coupled to the touchscreen and the other coupling element assembly is coupled to the counterweight.

Finally, it can be advantageous that the counterweight is arranged behind the touchscreen, that the actuator is arranged behind the counterweight and thus the counterweight is arranged between the touchscreen and the actuator, and that the counterweight has a through-going opening through which the coupling element assembly connected to the touchscreen extends.

According to another embodiment, the operating unit according to the invention can further comprise a supporting element on which the touchscreen and/or the counterweight is/are supported, wherein either the touchscreen or the counterweight or both is/are spring-elastically supported on the supporting element.

Finally, it can be advantageous when the two coupling element assemblies rest upon the supporting element and are in particular articulated thereto such that they are deformed for absorbing kinetic energy when a stroke force is applied to the touchscreen.

Figure 2:
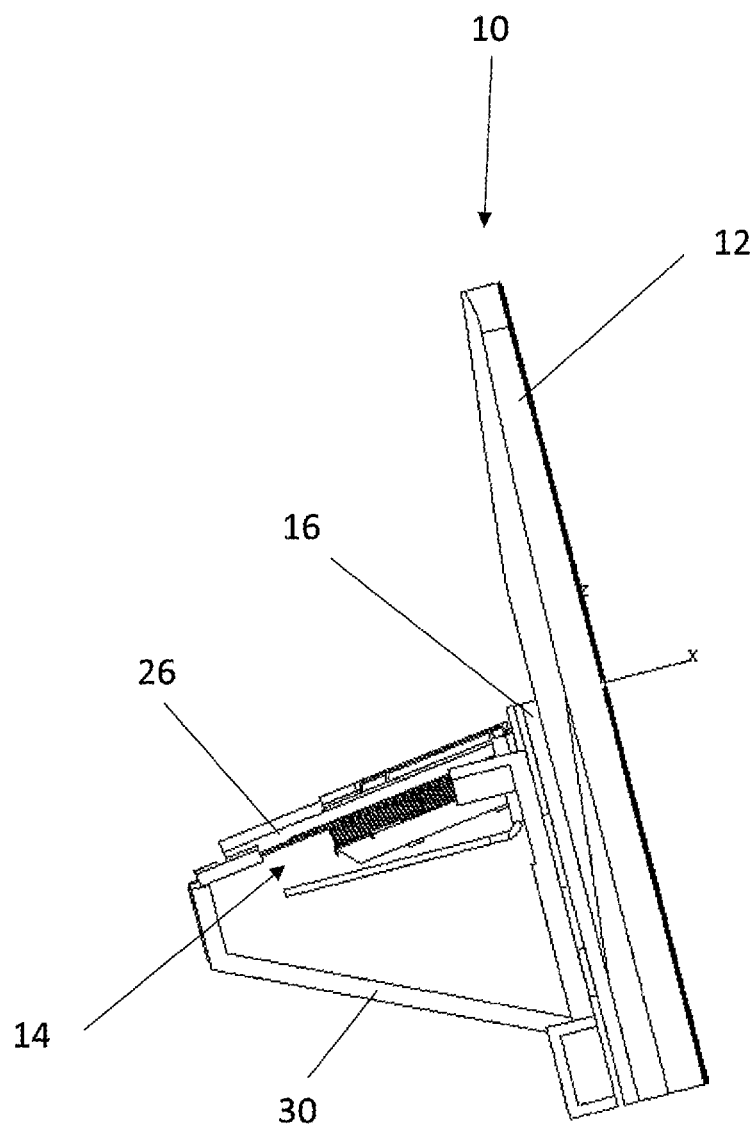
Figure 3:
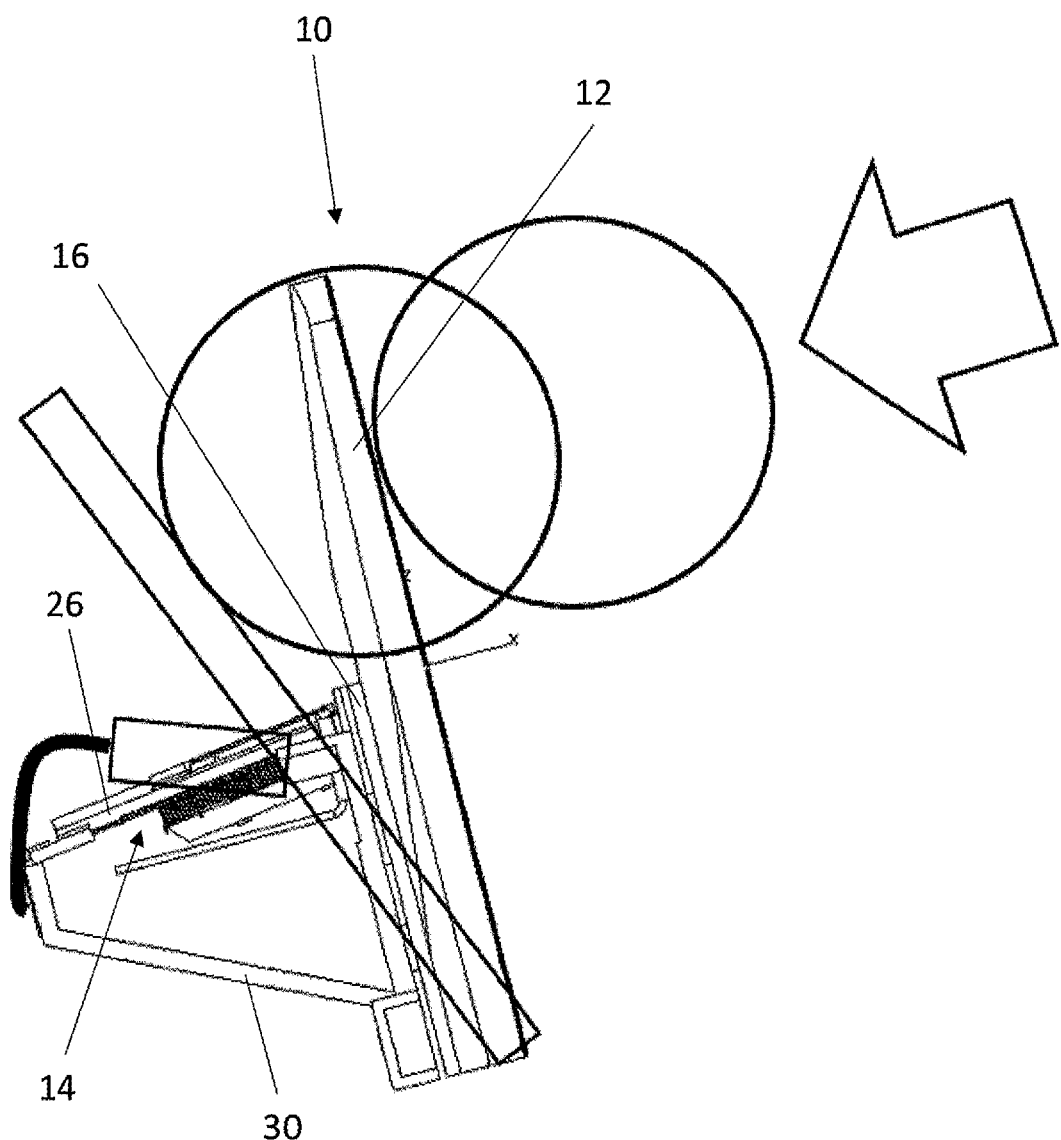

Hereunder an exemplary embodiment of the invention will be explained in detail with reference to the drawing in which:

FIG. 1 shows a view of the rear side of an operating unit according to an exemplary embodiment of the invention, FIG. 2 shows a side view of the operating unit of FIG. 1, and FIG. 3 shows the situation (in a side view) in which a stroke force acts upon the operating element.

FIG. 1 shows the rear side of an operating unit 10 which includes a touchscreen 12 that is adapted to be mechanically excited in a pulsated manner by an actuator for generating a tactile haptic feedback upon entry by a person. In the case of a pulsated excitation of the touchscreen 12, a counterweight 16 is also mechanically excited, namely in a manner phase-shifted by 180° with respect to the mechanical excitation of the touchscreen. The actuator comprises a stator 18 and a translator 20 which are mechanically coupled to the counterweight 16 and the touchscreen 12. Actuation of the actuator is performed by feeding current to an excitation coil 22. The mechanical coupling is realized via a coupling element or a coupling element assembly 24, respectively, and a coupling element assembly or a coupling element 26, respectively, wherein, according to this exemplary embodiment, the coupling element 24 serves for coupling between the translator 20 and a supporting element 30, while the stator 18 is coupled to the touchscreen 12. A through-going opening 28 in the supporting element 30 serves for a mechanical connection between the stator 18 and the touchscreen 12 via the coupling element 26.

FIG. 2 shows a side view of the operating unit of FIG. 1, and FIG. 3 shows a side view of the operating unit when simulating a stroke test.

LIST OF REFERENCE NUMERALS

10 Operating unit
12 Touchscreen
14 Actuator
16 Counterweight
18 Stator
20 Translator
22 Excitation coil
24 Coupling element assembly
26 Coupling element assembly
28 Through-going opening
30 Supporting element

The invention claimed is:

1. An operating unit for a vehicle, comprising
a touchscreen,
an actuator for mechanically exciting the touchscreen upon detection of a valid manual actuation of the touchscreen when an operating command is input, and
a counterweight,
wherein the actuator as a drive unit is configured with a stator and a translator which, upon actuation of the drive unit, move in opposite directions either away from each other or towards each other starting from a rest position, namely into an end position, and which in particular automatically move back from the end position into the rest position when the actuation has been ended,
wherein the stator is coupled to the touchscreen and the translator is coupled to the counterweight, or vice versa,
wherein the translator and the stator are connected to a first coupling element assembly and a second coupling element assembly, respectively, wherein the first coupling element assembly is coupled to the touchscreen and the second coupling element assembly is coupled to the counterweight, and
wherein the counterweight is arranged behind the touchscreen, the actuator is arranged behind the counterweight and thus the counterweight is arranged between the touchscreen and the actuator, and the counterweight has a through-going opening through which the first coupling element assembly connected to the touchscreen extends.

2. An operating unit for a vehicle, comprising
a touchscreen,
an actuator for mechanically exciting the touchscreen upon detection of a valid manual actuation of the touchscreen when an operating command is input,
a counterweight, and
a supporting element on which the touchscreen and/or counterweight is/are supported,
wherein either the touchscreen or the counterweight or both is/are spring-elastically supported on the supporting element,
wherein the actuator as a drive unit is configured with a stator and a translator which, upon actuation of the drive unit, move in opposite directions either away from each other or towards each other starting from a rest position, namely into an end position, and which in particular automatically move back from the end position into the rest position when the actuation has been ended,
wherein the stator is coupled to the touchscreen and the translator is coupled to the counterweight, or vice versa,
wherein the touchscreen and the counterweight are coupled to a first coupling element assembly and a second coupling element assembly, respectively, and
wherein the first and second coupling element assemblies rest upon the supporting element and are in particular movably connected thereto, and the first and second coupling element assemblies each comprise at least one connecting element which is deformed when a stroke force is applied to the touchscreen for absorbing kinetic energy.

3. The operating unit according to claim 1, wherein the drive unit is configured as an electromagnet, in particular an armature-type electromagnet, wherein either the stator or the translator comprises an excitation coil, and a portion of the electromagnet which is provided with the excitation coil is coupled to the counterweight.

4. The operating unit according to claim 1, wherein the drive unit is configured as a plunger-coil-type drive having an excitation coil, and a portion of the plunger-coil-type drive which comprises the excitation coil is coupled to the counterweight.

5. The operating unit according to claim 1, wherein the translator and the stator are connected to a first coupling element assembly and a second coupling element assembly, respectively, wherein the first coupling element assembly is coupled to the touchscreen and the second coupling element assembly is coupled to the counterweight.

6. The operating unit according to claim 1, comprising a supporting element on which the touchscreen and/or the counterweight is/are supported, wherein either the touchscreen or the counterweight or both is/are spring-elastically supported on the supporting element.

7. The operating unit according to claim 2, wherein the drive unit is configured as an electromagnet, in particular an armature-type electromagnet, wherein either the stator or the translator comprises an excitation coil, and a portion of the electromagnet which is provided with the excitation coil is coupled to the counterweight.

8. The operating unit according to claim 2, wherein the drive unit is configured as a plunger-coil-type drive having an excitation coil, and a portion of the plunger-coil-type drive which comprises the excitation coil is coupled to the counterweight.

9. The operating unit according to claim 2, wherein the translator and the stator are connected to a first coupling element assembly and a second coupling element assembly, respectively, wherein the first coupling element assembly is coupled to the touchscreen and the second coupling element assembly is coupled to the counterweight.

10. The operating unit according to claim 2, comprising a supporting element on which the touchscreen and/or the counterweight is/are supported, wherein either the touchscreen or the counterweight or both is/are spring-elastically supported on the supporting element.

* * * * *